Oct. 6, 1970 W. L. GLOMB ET AL 3,532,985

TIME DIVISION RADIO RELAY SYNCHRONIZING SYSTEM USING DIFFERENT SYNC CODE WORDS FOR "IN SYNC" AND "OUT OF SYNC" CONDITIONS

Filed March 13, 1968 6 Sheets-Sheet 1

INVENTORS
WALTER L. GLOMB
DONALD R. CAMPBELL
BY Alfred C. Hill
AGENT

INVENTORS
WALTER L. GLOMB
DONALD R. CAMPBELL
BY Alfred C. Hill
AGENT

INVENTORS
WALTER L. GLOMB
DONALD R. CAMPBELL
BY Alfred C. Hill
AGENT

TIME DIVISION RADIO RELAY SYNCHRONIZING SYSTEM USING DIFFERENT SYNC CODE WORDS FOR "IN SYNC" AND "OUT OF SYNC" CONDITIONS

Filed March 13, 1968 6 Sheets-Sheet 4

INVENTORS
WALTER L. GLOMB
DONALD R. CAMPBELL
BY Alfred C. Hill
AGENT

INVENTORS
WALTER L. GLOMB
DONALD R. CAMPBELL
BY Alfred C. Hill
AGENT

INVENTORS
WALTER L. GLOMB
DONALD R. CAMPBELL
BY Alfred C. Hill
AGENT

United States Patent Office 3,532,985

Patented Oct. 6, 1970

3,532,985

TIME DIVISION RADIO RELAY SYNCHRONIZING SYSTEM USING DIFFERENT SYNC CODE WORDS FOR "IN SYNC" AND "OUT OF SYNC" CONDITIONS

Walter L. Glomb, Nutley, and Donald R. Campbell, Glen Ridge, N.J., assignors, by mesne assignments, to the United States of America as represented by the Administrator of the National Aeronautics and Space Administration Filed Mar. 13, 1968, Ser. No. 712,658
Int. Cl. H04b 7/20
U.S. Cl. 325—4 10 Claims

ABSTRACT OF THE DISCLOSURE

To enable a plurality of stations to gain access to and communicate through a common repeater in a different time slot of a time division multiplex format at the repeater, each of the stations include a matched filter to produce a master sync pulse identifying the beginning of the format from a distinctive master code word transmitted from one of the stations through the repeater to all other stations. A binary counter responsive to the master sync pulse is preset to provide an output at the end of its counting cycle to produce a pulse identifying the time slot of the format that a particular station is to communicate in. A distinctive station code word is transmitted through the repeater back to the station and used in conjunction with the output of the counter to control the time of transmission from the station so that station burst is transmitted in the selected time slot through the repeater. An arrangement detects an error in the relative timing of the output of the counter and received station code word and causes the transmission of a distinctive low level, amplitude modiulated code word which when received from the repeater operates to correct the time of transmission so that there is no appreciable timing error and the station burst is transmitted through the repeater in its selected time slot.

BACKGROUND OF THE INVENTION

This invention relates to communication systems and more particularly to communication systems whereby a plurality of stations gain access to and communicate through a common propagation media such as a common repeater.

Multiple access communication systems have been utilized for many years to achieve multiple access to long distance telephone trunk systems. In addition, this multiple access technique is applicable to other communication systems including, but not necessarily restricted thereto, (1) supervisory control systems to enable supervision, from a fixed common repeater or from a central station through the common repeater of the activities of a plurality of mobile stations, (2) remote control systems to enable control, from a fixed common repeater, or from a central station through the common repeater, of various responsive devices contained in a plurality of mobile stations, (3) communication systems to establish, maintain and/or enable communication between a fixed common repeater, or a communication center coupled to the fixed common repeater, and a plurality of mobile stations, such as is necessary between an airport control tower and a plurality of airliners, and between a dispatcher communication center and a fleet of taxicabs, emergency vehicles and cargo carrying trucks, and (4) a communication satellite system to enable a plurality of fixed ground stations to utilize a common repeater carried by an orbitting satellite.

In providing the multiple access for the various systems above set forth, different techniques have been employed in the past. One such technique is the so called random access technique to enable a plurality of stations to have access to and communicate through a common repeater on an undefined basis, namely, a random basis. Another such technique to permit achieving of multiple access is in the employment of frequency division multiplex techniques wherein each of the plurality of stations employs a different carrier signal and wherein the common repeater has the bandwidth to handle all of the different frequency carriers and the intelligence carried thereon. Still another technique enabling multiple access to a common repeater has been by the employment of time division multiplex techniques wherein each of the plurality of stations are assigned to or are capable of selecting a time slot in a time division multiplex frame or format at the common repeater to thereby permit communication throughout the common repeater in a non-interferring relationship.

In multiple access systems employing time division multiplex techniques it is mandatory that there be a strict time synchronization so that each of the plurality of stations transmit their intelligence in a different one of a plurality of time slots of a time division multiplex format and be so confined to that time slot selected for a particular station that its communication will not interfer with communications of other stations in adjacent time slots of the format.

The multiple access systems employing time division multiplex techniques have used both analog modulation, such as pulse amplitude modulation and pulse position modulation and digital modulation, such as pulse code modulation. The general trend is toward pulse code modulation systems because of simplicity of radio equipment and efficiency of transmission in a power limited environment, such as may be encountered in satellite communication systems.

In time division multiplex multiple access systems, it has in the past, been the practice for the common repeater to receive a number of independent carrier signals and by commutation equipment carried in the repeater would interleave the independent carrier signals bit by bit in a continuous sequence. This arrangement requires considerable equipment in the repeater itself and, therefore, particularly where the repeater is mobile, such as in satellite communication systems and the like, there would result a weight problem for the vehicle carrying the repeater equipment and with respect to a satellite carrying the repeater equipment an increase in the cost of the launch vehicle to place the satellite in a desired orbit.

In a prior art time division multiplex multiple access system, such as described in U.S. Pat. No. 3,320,611 and Belgian Pat. No. 669,318, there is described an arrangement enabling a reduction in the hardware required in the repeater and, hence, a reduction in the problem of providing a vehicle to carry this repeater. By removing the time division multiplex equipment from the repeater itself it is possible to use a simple clipper/amplifier or hard limiting repeater.

It has been found, in addition, that the pulse or bit by bit interleaving imposes considerable equipment problems in the plurality of stations required access to the common repeater. This complexity can be overcome or at least materially reduced where the interleaving at the repeater is performed on bursts of pulses from each station.

Where there is relative movement between the common repeater and the plurality of stations, whether it is the repeater that is moving, or the stations that are moving, or both the repeater and stations moving relative to each other, it is necessary that the time division multiplex techniques for multiple access to the common repeater must be provided in some manner with the range information between the station considered and the common repeater being provided on a continuous basis. In the above cited prior art patents, this range information was obtained from a computer or like device contained in each of the plurality of stations which provide information of the relative location of and range between the common station and the considered one of the plurality of stations with the programming of the computer being based upon predicted relative movement between the common repeater and the considered station. The total inaccuracy of the range prediction with elementary equipment has been determined to be in the order of one microsecond. Hence, the system timing format was developed having a one microsecond guard band between transmission from each station and the next adjacent station in the format. To realize responsible efficiency of utilization of the common repeater, each station burst interval must be long in comparison to this guard band, hence, a burst length of 125 microseconds was established. Thus, each station must have equipment to store communication traffic for a short period of time and transmit this in a 125 microsecond burst. The repetition interval and consequently the required storage time is the product of burst length and the number of simultaneous users for which the multiple access system has been designed.

SUMMARY OF THE INVENTION

An object of the present invention is to provide a time division multiplex multiple access system of the types described above employing time division multiplex techniques of an improved nature relative to the previously employed time division multiplex multiple access system.

Another object of the present invention is to provide a synchronizing system for a time division multiplex multiple access system wherein the synchronization equipment is located in each of the plurality of stations and the common repeater can be of the hard limiter, heterodyne type.

Still another object of this invention is to provide a synchronizing system for a time division multiplex multiple access system that does not require knowing or predicting the position of the considered station and the common repeater and the range between the considered station and the common repeater.

A further object of this invention is to provide a synchronizing system for a time division multiplex multiple access system wherein the range information is continuously obtained automatically without relying on known or predicted relative position and relative range between the considered station and the common repeater.

A feature of this invention is the provision of a synchronizing system for a time division multiplex multiple access communication system where there is relative motion between the common repeater and each of the plurality of stations wherein one of the plurality of stations transmits a master code word through the repeater to all of the other stations so that each of these stations have available a master sync pulse defining the time division multiplex format at the repeater. Utilizing this master sync signal each station can select an appropriate time slot or channel in the time division multiplex frame or format at the common station in which it desires to communicate through the common station. To maintain the time of transmission from a particular station in its selected time slot, the considered station transmits a station code word through the repeater back to itself with this station code word being acted upon appropriately to maintain the time of transnmission of intelligence from that particular station in its selected time slot at the common repeater. If for some reason, such as a changing range condition, a timing error develops in the time of transmission from a particular station. This error is detected and causes the transmission of a low level, amplitude modulated pseudo random code word, the range determining signal, through the common station which is then detected by the originating station to provide information as to the range between that station and the common repeater and to readjust the timing of the time of transmission from that station so that the intelligence transmission therefrom is re-established to occur within the confines of the selected time slot of the time division multiplex format at the common station. Each of the plurality of stations also utilize the master code word and the station code word to develop the necessary timing signals to enable demultiplexing and demodulating the plurality of channels in a station burst received from the common repeater to enable recovery of intelligence directed to that station through the common repeater and, in addition, to enable the multiplexing of a plurality of channel signals in a station burst for transmission from that station to the common repeater and, hence, to a designated one of the plurality of stations to enable communication therebetween.

Another feature of this invention is the provision of a synchronizing system to be employed in a communication system having a plurality of stations gaining communication access to a common repeater on a time division basis wherein each of the stations comprise first means responsive to a master signal transmitted from one of the stations through the repeater to produce a master sync pulse identifying the frame period of the time division multiplex format at the repeater; second means coupled to the first means to select a time slot of the format with respect to the master sync pulse that a particular one of the stations will communicate in through the repeater; third means to control the time of transmission from the particular station through the repeater in the selected time, the transmission including a station identifying signal; fourth means coupled to the second means and the third means responsive to the station signal to maintain the time of the transmission so that the transmission is confined to the selected time slot; fifth means coupled to the fourth means to detect a timing error therein and produce a control signal; and sixth means coupled to the fifth means responsive to the control signal to transmit a pseudo random (pseudo noise) code word in place of the station signal; the fourth means responding to the code word received from the repeater to adjust the timing thereof to overcome the timing error and thereby cause the transmission to again be confined to the selected time slot.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figure 1:
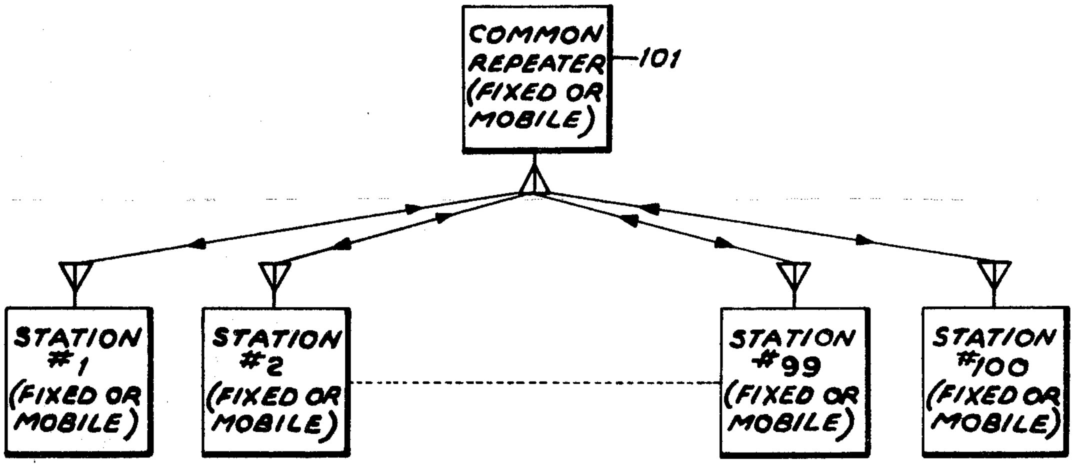
FIG. 1 is a block diagram illustrating the multiple access system in accordance with the principles of this invention.

Referring to FIG. 1, there is illustrated therein in block diagram form, a generalized multiple access communication system wherein a plurality of stations, which for purposes of illustration and explanation are assumed to be stations 1 to 100, are shown in two way communication with a common repeater 101. As indicated the common repeater 101 can be fixed or mobile and each of the stations 1 to 100 can be fixed or mobile. It should be noted that the multiple access system of FIG. 1 can be used in any of the applications outlined hereinabove under the heading "Background of the Invention." While this multiple access system can employ frequency division multiplex or random access techniques for multiple access in accordance with the principles of this invention, it is intended that multiple access be provided to repeater 101 by employing time division multiplex techniques.

Due to certain system requirements and other factors, a general set of boundary conditions for the transmitting format can be established. The minimum length of a station burst is determined by synchronizing time, position uncertainty of the moving component of the system, that is, either the repeater or the stations, and transmission efficiency. The maximum length of a station burst is affected by the economics of data storages at each of the stations 1 to 100. Thus, the formats, both the frame and burst formats, for the system of this invention and for the individual stations thereof are rather clearly bounded.

Although there is a variety of choices within the limitations discussed, other factors must be considered. These include the hardware implementation of the format. Here the choices are even wider, but economics is a large factor. For equipment reasons, it is convenient to deal with a format in which the number of bits per voice sample becomes a common denominator for other dimensions of the format. Each 7-bit sample can be considered a word. If each portion of the format consists of an integral number of words, hardware realization can be simplified. The formats discussed hereinbelow were chosen on this assumption.

For purposes of explanation, and not as a limitation to the scope of this invention, the following assumptions are made regarding system requirements: (1) number of duplex channels=600; (2) voice channel sampling rate=8,000 per second; (3) equivalent position uncertainty of mobile repeater or mobile station=±62 microseconds; (4) maximum number of ground stations having access to the common repeater=100; (5) pulse code modulation code resolution=128 levels (7-bits); and (6) maximum number of channels per station burst=12.

Figure 2:
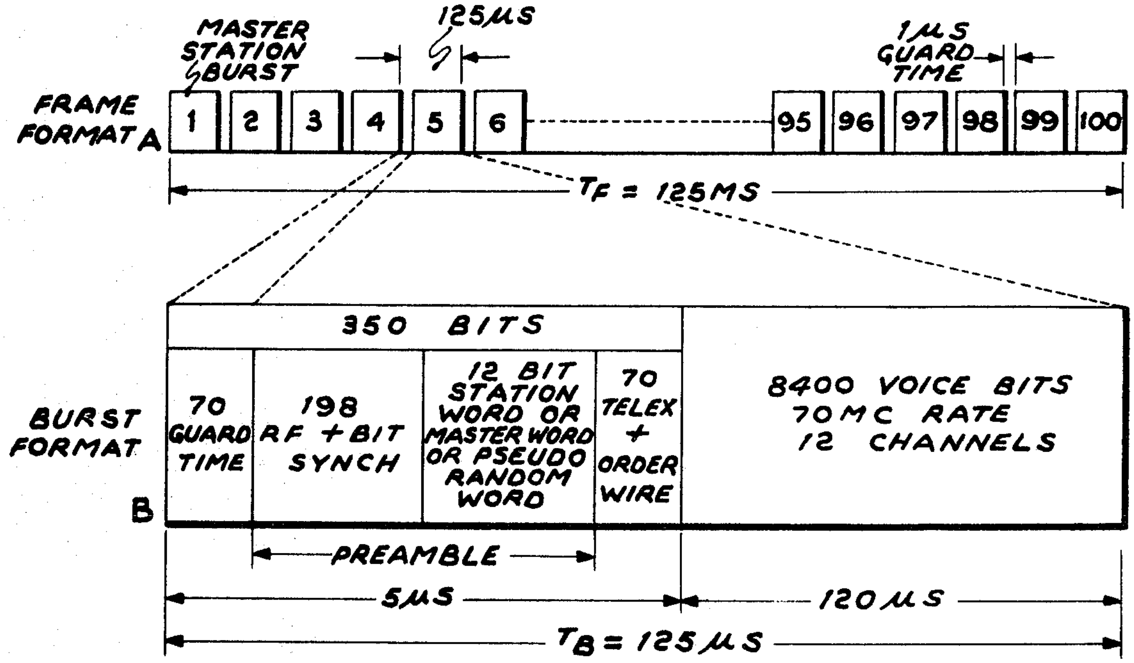
FIG. 2 illustrates the frame format of the time division multiplex frame at the common repeater of FIG. 1 and the burst format transmitted from each of the stations desiring access to the common repeater.

The limitation on positional uncertainty at initial acquisition and synchronization requirements are such that the station burst must be at least twice this uncertainty. Therefore, a minimum of 124-microsecond burst duration is required in order that an initial attempt at placing a pulse within the limits of such an interval will not result in the pulse overlapping the previous or following burst periods or time slots of the frame format shown in FIG. 2, Curve A. Establishing the slot length at exactly 125 microseconds and considering that there are a maximum of 100 stations in the network, each station repeats its burst every 12.5 milliseconds. Then, in real-time the number of bits in a burst equals the number of bits which are stored in 12.5 milliseconds. This figure is 12 channels times 7-bits times 8,000 samples per second times 0.0125. There are, therefore, 8,400 voice sample bits in each burst .To this must be added additional bits, or equivalent periods of time, to provide for order wire and system control functions, synchronization, guard time and telegraph channels. FIG. 2, Curve B illustrates a station burst format which accounts for these latter functions. A guard time of 70 equivalent bits has been chosen, in addition to 280 bits for synchronizing, order wire, and Teletype. The total number of bits per burst, then, is 8,750 including the 70 bit guard time. The bit rate, in order to accommodate these bits over the burst interval, must be 70 megacycles per second. Handling data serially at this rate is relatively difficult. However, handling it as parallel data at one megacycle per second would be simpler and more straight forward. Therefore, a 70-bit shift register is required in each station and format sections which are multiples of 70 bits become easier to handle. Other numbers than 70 are also possible. The format shown in FIG. 2, Curve B, however, assumes 70 bit segments of the serial stream.

The 70-bit length guard interval provides one microsecond of dead time at the beginning of each station burst. This is to account for small inaccuracies in aligning the burst in a time slot of the frame format and to permit the transients of the preceding bursts to die out. The synchronizing interval of 198 bits accomplishes the synchronization of two functions; (1) the receiver demodulator, and (2) the bit generator. The format framing function and master station identifier are accomplished in the following 12 bits.

Figure 6:
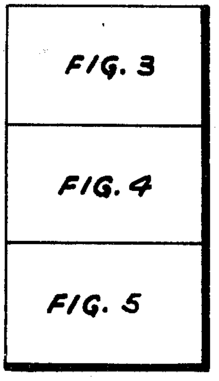
FIG. 6 illustrates how the sheets of drawings containing FIGS. 3, 4 and 5 should be arranged to fully illustrate the hardware employed in each of the plurality of stations.
Figure 3:
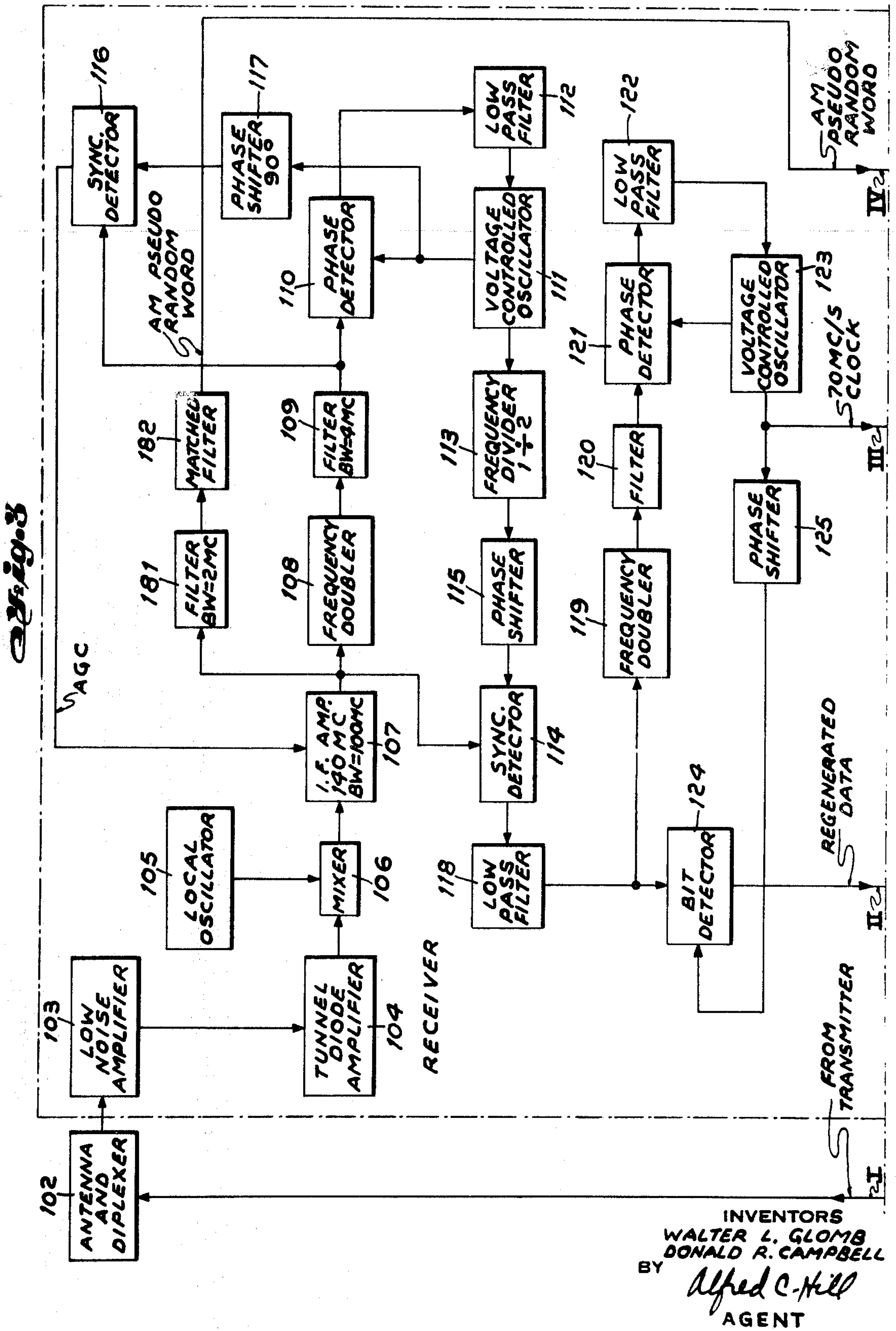
FIGS. 3, 4 and 5 taken together illustrate the hardware incorporated in each of the plurality of stations in accordance with the principles of this invention.
Figure 4:
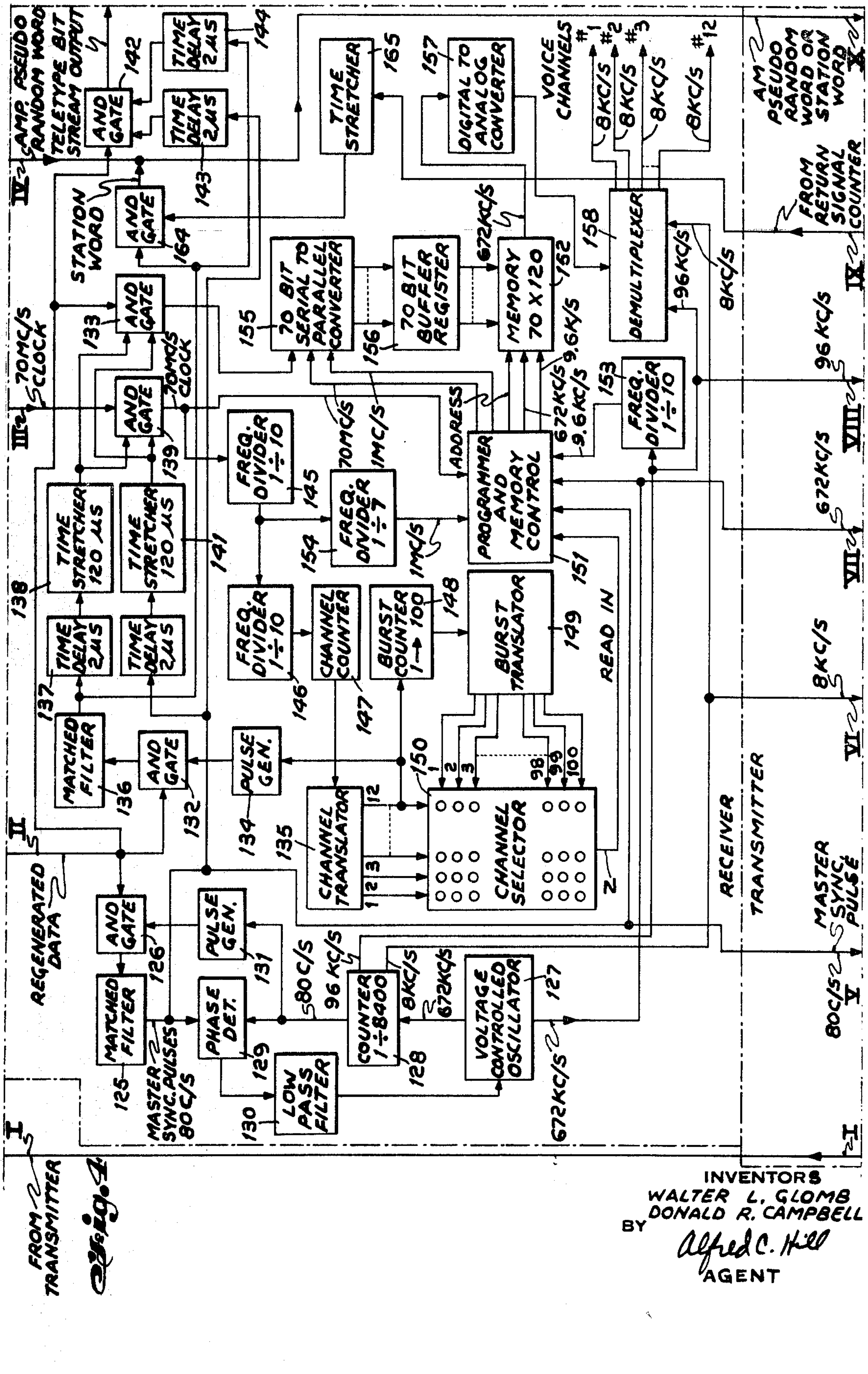
Figure 5:
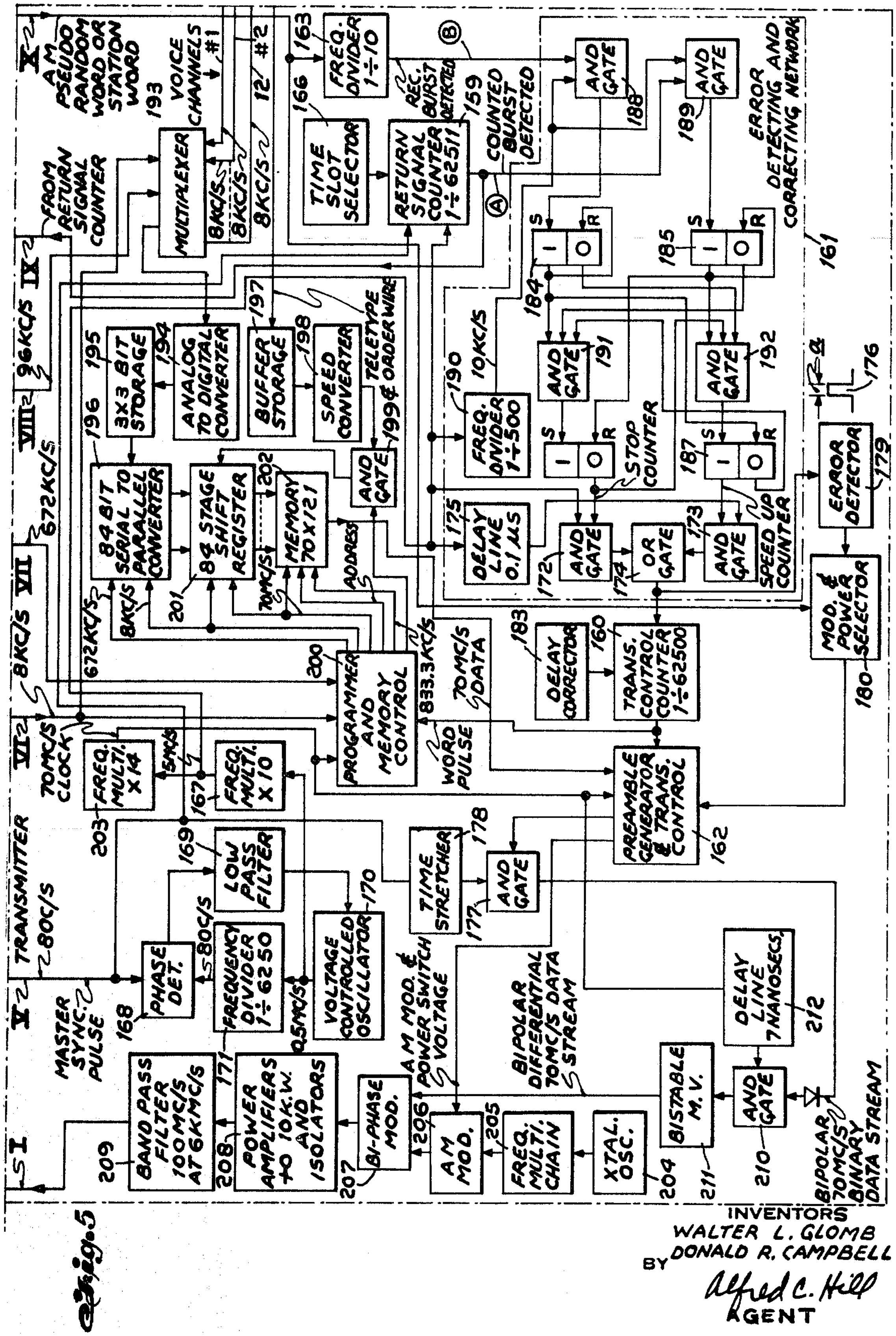

FIG. 6 illustrates how the drawing sheets containing FIGS. 3, 4 and 5 should be arranged to illustrate the block diagram of the equipment employed in each of the stations 1 to 100 of FIG. 1.

Referring to FIG. 3, the communication signal received from antenna diplexer 102 is amplified in a radio frequency amplifier which for example, particularly in conjunction with communication satellites, includes an ultralow noise, helium gas cooled amplifier 103 which is followed by an uncooled tunnel diode amplifier 104. The output of amplifier 104 is converted to an intermediate frequency (IF) of approximately 140 megacycles by local oscillator 105 and mixer 106. The IF signal is then preamplified to a suitable level in IF amplifier 107 having a center frequency of 140 megacycles and a bandwidth of approximately 100 megacycles.

The IF output signal of amplifier 107 is coupled to a frequency doubler 108 which is a square low device and the resulting wide spectrum signal is filtered in the 4 megacycle wide filter 109. The output from filter 109 is coupled to phase detector 110 which has its other input coupled to voltage controlled oscillator 111. The output from phase detector 110 is passed through low pass filter 112 to phase lock oscillator 111 in a phase lock loop of 2 megacycle noise bandwidth.

The output from oscillator 111 is essentially a 280 megacycle carrier on which the bi-phase modulation of the IF signal has been cancelled by the action of detector 110. As such, this signal, after frequency division by two in regenerative frequency divider 113, can be used as a reference carrier for synchronous detector 114 after appropriate phase shift in phase shifter 115.

The output from filter 109 is also coupled to synchronous detector 116 with its other input being coupled to oscillator 111 through phase shifter 117. The output of detector 116 is an automatic gain control voltage which is coupled to IF amplifier 107 to control the IF amplification. If, as pointed out hereinabove, frequency doubler 108 acts like a square law device and not like a limiter any variation in the level of the received carrier appears amplified at the output of filter 109. This increases the effectiveness of the automatic gain control and, with suitable choice of time constance involved, the amplitude of the IF output voltage from amplifier 107 can be kept practically constant, independently of possible variations in the level of the received carrier from burst to burst.

Thus, the IF output from amplifier 107 is applied to frequency doubler 108 in the form of a full wave rectifier in order to generate a discrete frequency component when the input is a random sequence of 1 and 0. This discrete frequency which is twice the IF frequency is operated on by the phase lock loop including phase detector 110, low pass filter 112 and oscillator 111. In order to minimize acquisition time, diode-resistor combinations are provided in parallel with the series resistor of filter 112. This arrangement improves the acquisition characteristic of the loop without seriously degrading its noise bandwidth.

The output of oscillator 111, after dividing by two in frequency divider 113 and phase shifting in phase shifter 115 to compensate for the phase shift of the loop, is used to synchronously demodulate the IF signal in synchronous detector 114 coupled to the output of phase shifter 115 and amplifier 107.

The output from detector 114 is coupled through low pass filter 118 and frequency doubler 119 through filter 120 to a phase lock loop including phase detector 121, low pass filter 122 and voltage controlled oscillator 123 to produce at the output of oscillator 123 the bit rate clock of 70 mc./s. The operation of this phase lock loop is essentially the same as that of the loop including detector 110 and oscillator 111 which is locked to the second harmonic of the IF signal.

The output from filter 118 is coupled directly to bit detector 124 with the other input thereto being provided by the output of oscillator 123 coupled through phase shifter 125. Detector 124 will decide whether a change of state occurred which will be taken to represent the presence of a 0 in the data. Thus, the output of detector 124 is the regenerated bits as long as the bits are not coherent with the IF signal.

Referring to FIG. 4, the 80 c.p.s. master sync pulse train and the 8 kc./s., 96 kc./s., and 672 kc./s. pulse trains necessary for the demultiplexing of the voice channels at the receiver and for their pulse code modulation and coding at the transmitter are generated in the following manner. The master station frame words are detected by matched filter 125 to which the regenerated binary bits are applied from detector 124 (FIG. 3) when AND gate 126 is open. To avoid the possibility that a sequence of information bits with characteristics equal to or similar to those of the frame word detected by filter 125, gate 126 is open only during the preamble portion of the master station burst. The 80 c.p.s. master sync pulses form filter 125 are used to phase lock the voltage controlled oscillator 127 which operates at a frequency of 672 kc./s. The output from oscillator 127 is divided by 8,400 in counter 128 and the resulting 80 c.p.s. pulse train is phase compared with the master sync pulses in phase detector 129. The output of detector 129 is coupled by means of low pass filter 130 to oscillator 127 for frequency control thereof. The output pulses from counter 128 are also used to synchronize pulse generator 131 which controls the opening of gate 126. The 672 kc./s. timing signal generated by oscillator 127 is first divided by 7 in counter 128 to generate a 96 kc./s. bit stream. This particular rate is then divided by 12 in counter 128 to generate an 8 kc./s. bit stream which is finally defined by 10 in counter 128 to generate the 80 c.p.s. pulse stream.

The regenerated data stream from detector 124 (FIG. 3) is applied simultaneously to AND gates 132 and 133. Gate 132 is open only during the preamble time of each burst as controlled by pulse generator 134 which receives its synchronization from the twelfth output of channel translator 135. The slave stations code words can thus be detected by matched filter 136. The resultant pulses at the output of filter 136 are delayed by two microseconds in time delay 137 and activate a 120 microsecond time stretcher 138 which commands AND gates 139 and 133. The two gates 133 and 139 are also commanded by the master synch pulses from the output of filter 125 through a two microsecond delay network 140 and a 120 microsecond time stretcher 141. As a consequence, the 70 mc./s. clock form oscillator 123 (FIG. 3) appears at the output of AND gate 139 and the regenerated data from detector 124 (FIG. 3) appears at the output of gate 133. The output from gates 133 and 139 appear only during the time in which information bits are received.

AND gate 142 having one input coupled to detector 124 (FIG. 3) and its command inputs applied through time delay networks 143 and 144 coupled, respectively, to filter 125 and filter 136 separate the teletype and order wire bits of each burst which appear at the output of gate 142.

The burst bit stream at the output of gate 133 is composed of 8,400 bits representing 100 samples of each of 12 channels. Each 700 bit piece representing one channel occurs in sequences, that is, the samples from the different channels are not interleaved.

The 70 mc. clock at the output of gate 139 is coupled to frequency dividers 145 and 146 in the form of binary counters coupled in cascade and to channel counter 147, translator 135 and burst counter 148 connected in cascade with each other and with the output of the cascade connected dividers 145 and 146. Divider 145 is driven by the 70 mc./s. clock output of gate 139 and enable the derivation of all channel and burst time positions. The 12 signals appearing at the output of translator 135 consists of 10 microsecond long pulses in synchronism with the voice channel which is being received. Similarly, the 100 output signals from translator 149 consists of 120 microsecond long pulses in synchronism with the burst which is being received.

In any instant, both the channel and burst translators 135 and 149 energize only one output each. This pair of outputs uniquely identify the particular channel being received. The twelve outputs form translator 135 and the 100 outputs form translator 149 are connected to a 12 x 100 patchboard, or channel selector 150 which effectively includes 1,200 AND gates. The channel selections are determined by the choice of the coordinates of selector 150 which are sent to the gate in question. The output Z from selector 150 consists of a train of pulses 10 microseconds long which is sent to programmer and memory control 151 which allows only the selected channels to be stored in the receiver memory 152.

Programmer and memory control 151 also receives timing inputs from filter 125, oscillator 127 and the 96 kc./s. output of counter 128 which is frequency divided by 10 in divider 153 to provide a 9.6 kc./s. timing signal. In addition, the output from divider 145 is divided in frequency divider 154 to provide a 1 mc./s. timing signal for programmer and memory control 151 along with the 70 mc./s. clock from gate 139.

During the time interval a pulse on output Z of selector 150 is sent to programmer and memory control 151, the 70 megacycle data stream from gate 133 is applied to 70-bit serial to parallel converter 155 together with the appropriate timing signals from programmer and memory control 151. The output from converter 155 is transferred to 70-bit buffer shift register 156 and from there is read into memory 152. The receiving station may, therefore, select up to 12 channels from the entire master frame. The 12 channels may be distributed in any manner throughout the master frame.

During the 12.5 millisecond duration between the reception of a group of 700 bits of one single channel, the stored binary digits are read out of memory 152, converted from digital to analog in digital to analog concerter 157 and finally demultiplexed in demultiplexer 158 to which the 96 kc./s. and 8 kc./s. timing signals are applied from counter 128.

Referring to FIG. 5, the circuits disclosed therein and described hereinafter are used to place a station burst in the properly assigned time slot at the repeater. To accomplish this, two binary counters are utilized, one to generate a signal for the timing of the assigned slot with respect to the master sync pulse identified as return signal counter 159 and the other to control the start of transmission identified as transmission control counter 160. The logic circuitry identified as error detecting and correcting network 161 connected between counters 159 and 160 gives error detection and correction with a resolution of 0.2 microsecond. Network 161 used to synchronize the station burst in the time frame format of the system is based on the fact that the maximum two way Doppler rate encountered is not greater than $0.06\times10^{-6}$ c.p.s. This value is sufficiently small to permit instantaneous correction of the timing of the burst neglecting the delay introduced between propagation to and from the common repeater. The maximum relative variation of the interval between a master sync word and a station word, for a two-way transmission of 120 milliseconds, is, thus, only $$2\times0.006\times10^{-6}\times120\times10^{-3}=1.2\times10^{-9}$$

of the original interval and can be disregarded.

Let us assume that the station burst timing has already been synchronized. The station preamble generated in preamble generator and transmission control 162 will phase modulate the transmission carrier which is transmitted to the common repeater and after a certain interval in the order of say 120 milliseconds is received back at the particular station considered. The stations preamble or burst word is detected by matched filter 136 (FIG. 4) and the resulting pulse is applied to frequency divider 163 in the form of a binary counter through AND gate 164 (FIG. 4) which is commanded by the output of counter 159 (FIG. 5) applied to time stretcher 165 (FIG. 4). Similarly, the master sync pulses detected by filter 125 are applied to counter 159. Counter 159 has been preset by time slot selector 166 to generate a pulse A after 625N, where N is the number of the time slot in which the station is supposed to be transmitted, bits of a 5 mc./s. timing signal have been counted. The 5 mc./s. signal is generated at the output of frequency multiplier 167 which derives its input from the phase lock loop including phase detector 168 coupled to the output of filter 125, low pass filter 169, voltage controlled oscillator 170 operating at a frequency of 0.5 mc./s. and frequency divider 171.

By employing selector 166, counter 159 is adjusted to start at a point along its counting sequence so that the final count is at the end of a counting sequence. Slot selector 166 may be realized by a group of toggle switches which are set for the desired counter cycle.

Counter 159 is divided into two parts. One, which divides the 5 mc./s. output of multiplier 167 by 625 to generate a slot counter having a period of 125 microseconds and another which takes 1 to 99 counts to mark the proper slot after the master sync pulse. The division by 625 is accomplished with a 10 stage counter, which can count to 1024, modified by feedback to skip 399 counts. The 1 through 99 counter is a seven stage counter capable of counting to 128, preset by slot selector 166 to skip a number of counts from 29 to 127.

Frequency divider 163 generates one pulse B after 10 station burst words have been received. This means that only one out of 10 station bursts are effective for synchronization purposes. The reason for this will be apparent later.

The pulses A and B are applied to network 161 which commands AND gates 172 and 173 whose outputs are coupled through OR gate 174 to counter 160. Gates 172 and 173 are commanded in such a way that during the interval between the two pulses A and B, both gates 172 and 173 are open if pulse A precedes pulse B and both gates are closed in pulse A follows pulse B. Outside the interval in question only gate 172 is open. The clock bit streams through gates 172 and 173, which are counted by counter 160, are derived from the output of frequency multiplier 167 (5 mc./s.) but are displaced have a period (0.1 microsecond) between them by means of delay line 175. As a consequence, when both gates 172 and 173 are on, counter 160 counts at twice the normal speed. When both gates 172 and 173 are closed the pulse at the output of counter 160 which triggers the transmission of the station burst will be delayed in time by an interval equal to the width *a* of the error pulse 176 appearing at the output of network 161. The synchronization process is self-adjusting and a steady state is reached where pulse A and pulse B are almost simultaneously and the width of the error pulse is very small.

If for any reason the master sync pulses are not received or detected at the ground station, AND gate 177 will be open after a short interval by the action of time stretcher 178 to permit the output from generator and control network 162 to be applied to the transmitting equipment as will be described hereinafter.

Similarly, if for any reason, the width of the error pulse 176 exceeds a predetermined value (+0.2 microsecond), error detector 179 will activate modulation and power selector 180 in a manner to reduce the carrier power of the transmitter by a value, such as 25 db, and simultaneously switches the transmitter from phase to amplitude modulation. The transmission of a non-synchronized amplitude modulated psuedo random code word at reduced power will introduce a certain amount of phase jitter on the particular carrier which is simultaneously received by the repeater. However, this is rather small and will not sensibly affect the intelligibility of any of the communication channels. The transmission of these amplitude modulated pseudo random code words will be repeated at every frame until it's received at the repeater during the desired time slot, passed almost undistorted through the repeater and retransmitted to the station under consideration.

This amplitude modulated burst word amplified by the front end of the receiver and IF amplifier 107 (FIG. 3), coupled through a 2 mc./s. wide filter 181 (FIG. 3) and then is detected in matched filter 182 (FIG. 3). The resulting pulse at the output of filter 182 is used for synchronization of frequency divider 163 in the same way as the normal station burst words detected in filter 136 (FIG. 4).

To make up for the additional noise that may be introduced at the repeater, the pseudo random code words are transmitted at a lower speed as controlled in circuitry 162 by the output of selector 180 in proportion to the ratio between thermal noise of the receiver and the sum of that noise and the noise received from the repeater. The rate used is one megacycle per second. This is possible because during the synchronization process the burst words can be kept considerably longer than in the synchronized condition.

Once the synchronization of the amplitude modulated pseudo noise code word is achieved and the width *a* of error pulse 176 is less than the threshold value ±0.2 microsecond, preamble generator 162 is shifted from low to high speed and the transmitter from amplitude to phase modulation by action of error detector 179 which commands the modulation and power selector 180.

To facilitate the synchronization, when the loop time delay between the station considered and the common repeater is known within a precision better than ±62 microseconds, counter 160 is preset by a corresponding amount by delay corrector 183 so that the first received burst word will fall somewhere in the desired time slot and the synchronization procedure is accelerated.

Some difficulty in the synchronization along the lines just outlined could arise when all stations of a group attempt to synchronize simultaneously to the common repeater if the amplitude modulated pseudo random code word of the stations are equal. This difficulty can be somewhat alleviated by choosing these code words mutually orthogonal. Even so, to avoid suppression of the amplitude modulation of the code words in the common repeater when many carriers are present, synchronization should be performed by one station at a time according to a predetermined sequence.

In the synchronized condition, the use of a common phase modulated station code word for all the slave stations is not detrimental because of the selective action of gate 164 (FIG. 4) which is commanded by the output of counter 159 (FIG. 5) applied through time stretcher 165 (FIG. 4) which opens the gate 5 microseconds before the arrival of the next pulse A and closes it after 5 microseconds.

If the correction of the timing of the transmission of the station burst is effected every time a station word is received, instabilities in the synchronization loop could arise due to the propagation delay to and from the repeater. The synchronization loop is essentially a sampled data servo with finite delay. Thus, after each correction, the station must wait for an interval equal to the delay in question before attempting a new correction. This is accomplished by frequency divider 163 which allows only the use of every 10 received station code words to be effective for synchronization correction. The exact number by which divider 163 divides depends, of course, on the maximum time delay to be expected. A division by 10 is adequate for the maximum time delay of 120 milliseconds.

To preset counter 160 by delay corrector 183, a calculation is made involving the time at which the slot appears after the master synch pulse and the time required for the transmitted signal to reach and return from the repeater, neglecting integer multiples of the time for a single frame. This adjustment is again accomplished by toggle switches in accordance with the calculations. When the toggle switches are appropriately set the transmission cycle may be started by depressing a starter button. This allows the switch settings to reset counter 160 to the initial setting determined by the calculation so that the final count is always at the end of the counter sequence. Besides the usual chain of flip-flops, counter 160 contains an additional flip-flop. This logic element resets with the depressing of the start button so that the counter 160 is inhibited from running until a master sync pulse sets it again. Thus, counter 160 is started by the master sync pulse from an initial setting which ensures that the first transmission will fall somewhere within the desired time slot.

Network 161 includes four flip-flops 184, 185, 186 and 187 whose operation are controlled by AND gates 188 and 189 commanded by the 10 kc./s. output of frequency divider 190 whose input is coupled to the output of multiplier 167. The 1 outputs from flip-flops 184 and 185 control the operation, together with the 0 output of the flip-flops 186 and 187 of AND gates 191 and 192. As mentioned previously, the AND gates 172 and 173 are commanded by the 5 mc./s. output of multiplier 167 applied directly and through delay line 175 with the AND gate 172 being coupled to the 0 output of flip-flops 186 and AND gate 173 being coupled by the 1 output of flip-flop 187. The burst code word which was sent about 10 frames previously returns and generates a pulse on the "received burst detected" line at the output of divider 163. The error checking counter 159 generates a pulse on the "counter word detected" line when it reaches the count of which the burst word is supposed to appear. If the output pulse from divider 163 arrives first, the burst word is transmitted too early and the "stop counter" line or 0 output of flip-flop 186 drops thereby removing the drive pulse at the output of AND gate 172 from the input to counter 160 until the pulse at the output of counter 159 resets the circuit. This results in the next transmission being delayed by the amount of the error and brings the burst into proper time slot alignment. If the pulse at the output of counter 159 arrives first, the burst word was transmitted too late and the "speed up counter" line, or the 1 output of flip-flop 187 is set to 1. This enables a second 5 mc./s. clock pulse to be interleaved with the first 5 mc./s. clock pulse to thereby step the counter 160 at twice its normal speed. Counter 160 is stepped at twice the speed until the output of divider 163 resets the flip-flops and the counter 160 resumes normal counting speed. Thus, counter 160 receives a number of extra equal in counting time to the error and the burst is then essentially properly aligned in the selected time slot. It will be observed that if the pulse at the output of divider 163 and the pulse in the output of counter 159 arrive at the same 5 mc./s. clock pulse time neither flip-flop 185 or 187 is set and counter 160 continues undisturbed.

Counter 160 includes 16 trigger flip-flops, each stage of which is driven by the preceding stage. The first stage is driven by a controlled 5 mc./s. clock at the output of network 161 which can be stopped to delay the transmission, or sped up to advance the transmission. Since a 16 stage counter will normally count up to 65,536 and since 62,500 counts are required for a 12.5 millisecond period, when the code reaches 32,768, that is, when the last stage becomes 1, the third, fourth, fifth, seventh, eighth, ninth, tenth and eleventh stages are set into the 1 state by a feedback from the last stage. This adds 3,036 to the accumulated account, thus reducing the total code in every cycle by the same amount.

The 12 voice channels to be transmitted from the station in question is applied to multiplexer 193 which receives its 8 kc./s. and 96 kc./s. timing signals from counter 128 (FIG. 4). The output of multiplexer 193 is coupled to analog to digital converter 194 to code the samples of the voice channel. The output of converter 194 is coupled to storage unit 195 and, hence, to the 84 bit serial to parallel converter 196. The Teletype and order wire signals are stored in buffer storage 197 whose output is applied to speed converter 198 to change the speed of these signals to be compatible with the speed of the signals at the output of converter 196. The output of converter 198 is coupled to AND gate 199 which under control of an output from programmer and memory control 200 couples the signals together with the output from converter 196 to the 84 stage shift register 201 whose output then is applied to memory 202. Programmer and memory control 200 receive its timing signals of 8 kc./s. from counter 128 (FIG. 4), 672 kc./s. timing signal from oscillator 127 (FIG. 4) and its 70 mc./s. clock or timing signal from frequency multiplier 203 (FIG. 5). The output for multiplier 203 is also coupled to generator and control unit 162. The programmer and memory control 200 controls by appropriate timing signals and address outputs the operation of converter 196, register 201 and memory 202.

The transmitting equipment includes a low frequency crystal oscillator 204 and a frequency multiplier chain 205 to produce a carrier signal of 6 kms./s. The output from frequency multiplier chain 205 is coupled to amplitude modulator 206 which is inoperative when the system is synchronized and only placed into operation when synchronization acquisition is necessary under control of selector 180. The carrier is then coupled to a bi-phase modulator 207 whose output is then coupled to power amplifiers and isolators 208 to provide a 10 kw. output which then is coupled to band pass filter 209 and, hence, to antenna and diplexer 102 (FIG. 3).

Phase modulation is performed at the carrier frequency rather than a sub-multiple in order to assure an accurate 180 degree relationship between the two phase states of the final output signal. Any phase deviation due to noise or hardware limitations would be multiplied and thus compounded if the modulation were affected at a frequency lower than that of the carrier.

Modulator 207 employs a voltage controlled phase shifting network capable of effecting shifts of up to $\pm 90$ degrees in response to a controlling voltage. The binary data stream coupled from memory 202 causes AND gate 210 to open whenever a 0 or negative voltage occurs, permitting the passage of a trigger through the gate to effect a change of state of bistable multivibrator 211. This results in a 180 degree phase change of the transmitted carrier in modulator 207. Upon receipt of 1, the gate remains closed and the carrier phase remains at the value it had previously assumed. The triggering pulses for gate 210 are derived from the 70 mc./s. clock at the output of multiplier 203 which is used to generate the binary data stream and are coincident with the pulse edges. In order to assure proper gating operation under these circumstances delay line 212 is included in the trigger path causing a trigger to be applied to gate 210 coincident with the midpoint of each data pulse. The 7 nanosecond delay of delay line 212 corresponds to approximately half a data pulse width.

As previously mentioned, modulator 206 is used only during synchronization acquisition time when it is necessary to transmit the amplitude modulated pseudo random code word generated in generator and control unit 162. While in normal synchronized operation modulator 206 is inactive.

Figure 7:
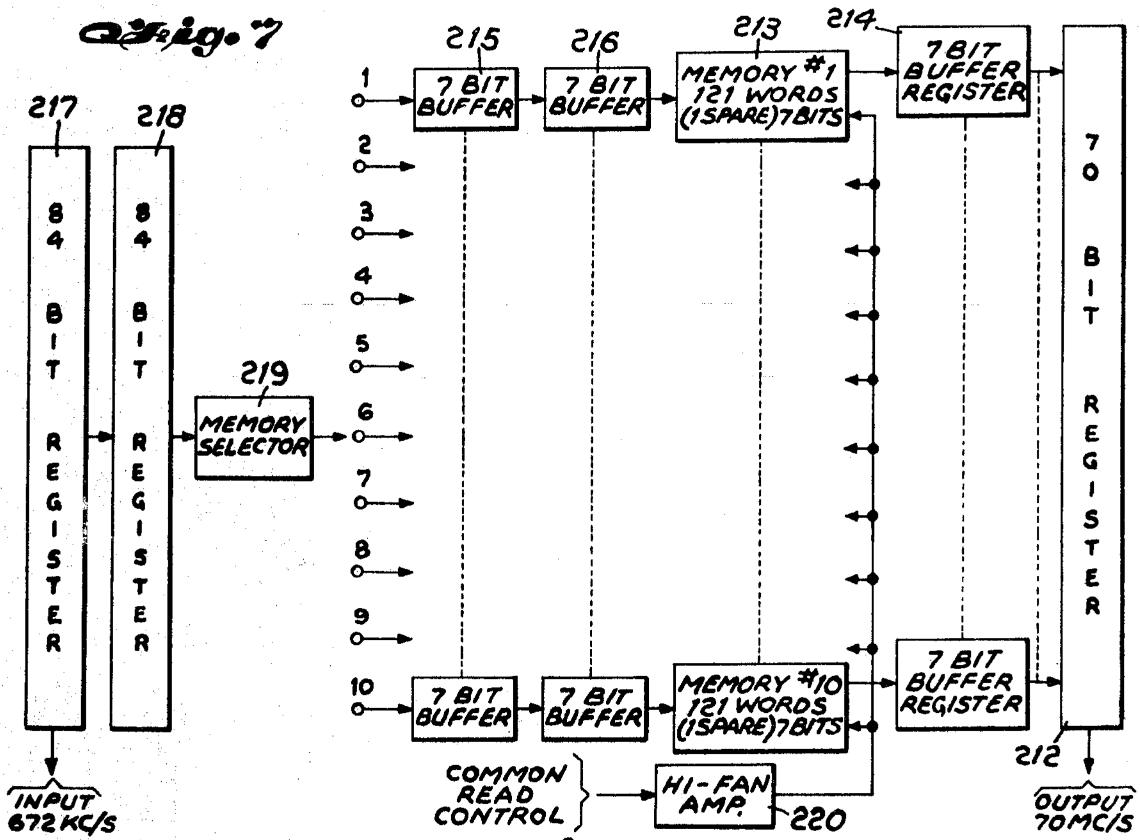
FIG. 7 illustrates a block diagram of a memory employed in the equipment of FIGS. 3, 4 and 5.

Referring to FIG. 7, there is illustrated therein one typical memory system that may be employed for memory 202 of FIG. 5. To provide the desired transfer from the memory to provide the desired output, it is necessary to provide a 70-bit buffer register 212 whose input is applied to a stack of ten 7-bit memories 213 with their associated 7-bit buffer output registers 214 and the two 7-bit input buffers 215 and 216. The information is read into each memory through two 84 bit registers 217 and 128 and a memory selector 219. After all ten memories are loaded the words are read out in parallel under control of the common read control signal applied through amplifier 220 and stored in register 212. By properly addressing each memory the parallel read out will store the bits in proper format at the output.

In a similar way, memory 152 of FIG. 4 can be implemented to accept the 70 mc./s. data and transfer the information through the memory selector 219 into the proper one of the memory 213. The parallel readout together with proper addressing will then transfer the information into the output register for the 672 kc./s. output data.

Figure 8:
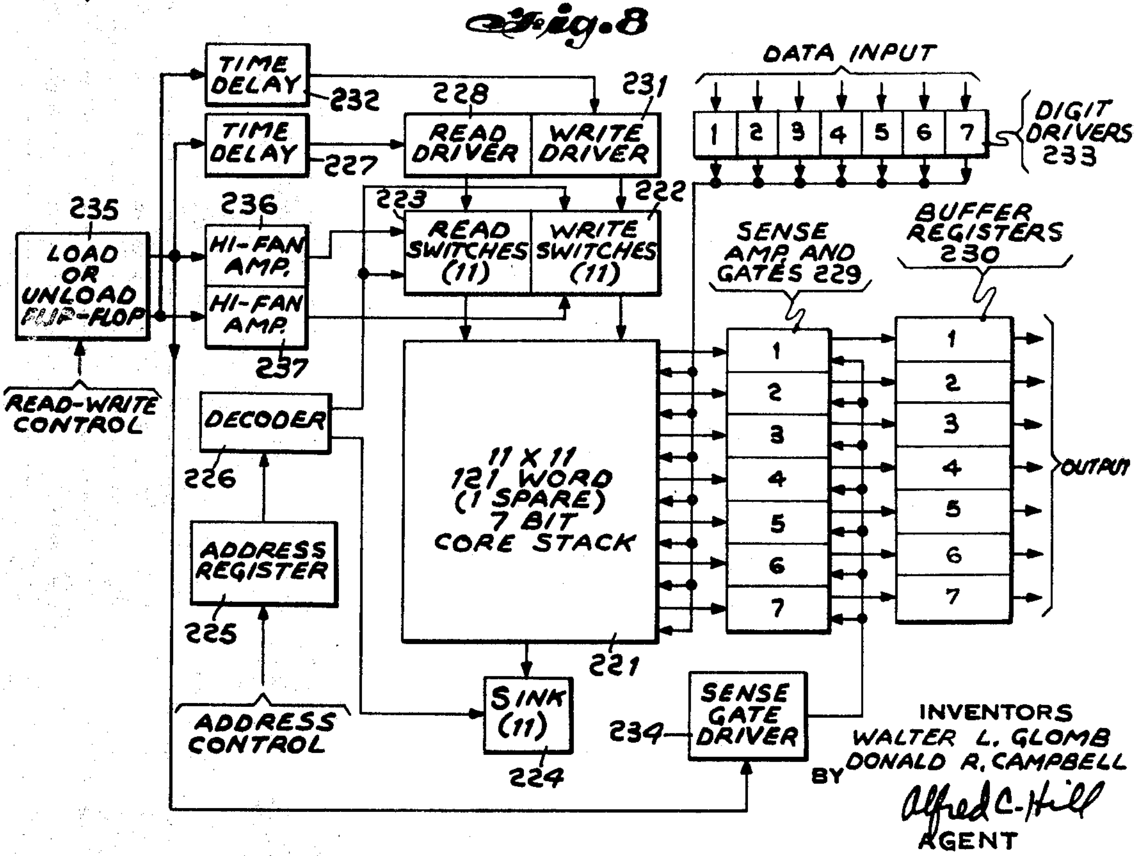
FIG. 8 illustrates in block diagram form the components forming one of the memories of FIG. 7.

Referring to FIG. 8, there is illustrated therein a block diagram of the components forming a typical one of memory 213 of FIG. 7. Each memory will contain a 7-bit, 121-word, core stack 221. One of the words therein will be used to store Teletype traffic inputs. The memory will either read or write continuously in one microsecond intervals and have a total read-write cycle time of two microseconds. Core stack 221 includes a diode matrix and a system of switches 222 and 223 and sinks 224 for proper word selection. This configuration is commonly referred to as a linear select memory and usually results in faster access time.

System operation starts with the address since the proper word must be selected before the drivers are turned on. This is accomplished through address register 225 which contains the information in binary form and decoder 226 which selects one of the switches 222 and 223 and one of the sinks 224. All other words in the memory are now isolated by means of the diode matrix. After a time delay provided by time delay 227, read driver 228 is turned on and a signal occurs in the sense line created by switching the cores. The appropriate one of sense amplifiers and gates 229 amplifies, rectifies, and determines whether the signal is a 1 or a 0. This information is then stored in the appropriate one of the buffer registers 230. Information is read into the memory by means of the write driver 231 receiving its input from time delay 232 and the digit drivers 233. Each of these provide effectively a half write current throughout the core. The write driver, therefore, by itself will not switch the core. However, when the digit driver is turned on simultaneously a full write pulse occurs which effectively sitches the core beyond the knee into the 1 state.

The sense gate driver 234 controls the sense amplifier and gates 229. The sense driver and read-write selection is accomplished by the load or unload flip flop 235 which selects the read or write through amplifiers 236 or 237 and the appropriate driver 228 or 231 through time delay means 227 or 232. Flip flop 235 also controls the operation of sense gate driver 234.

Figure 9:
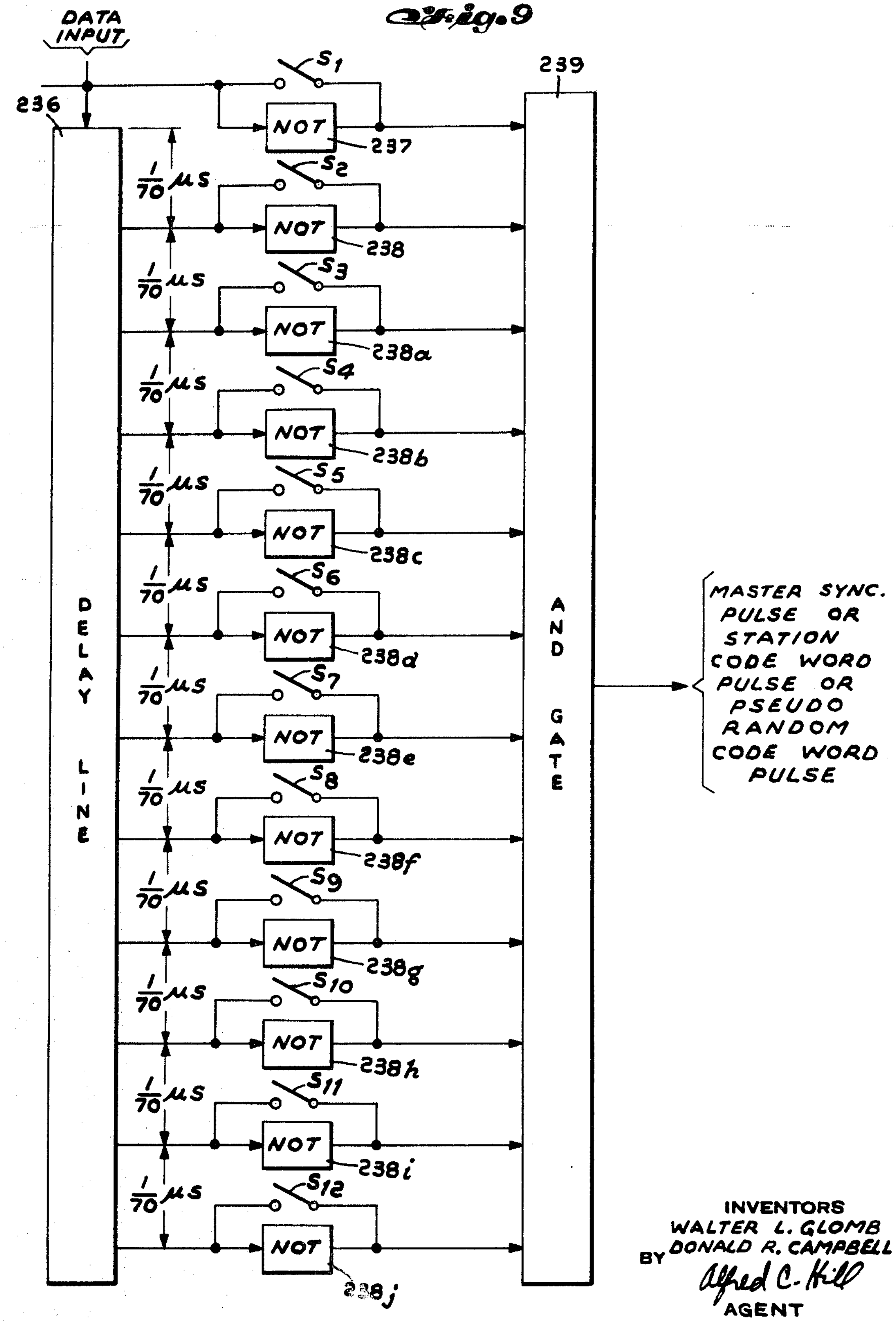
FIG. 9 is a generalized block diagram of the matched filters employed in the hardware of FIGS. 3, 4 and 5.

The burst word transmitted from the master control station is received at all other stations and is used to synchronize the various timing signals employed in the station and which controls the passage of information between multiplexer and memory and between memory and demultiplexer. The master burst word, or code word is a unique 12 bit word which may be decoded by the arrangement in FIG. 9. This arrangement also may be utilized to detect the station code word and the pseudo random code word and, thus, is a generalized block diagram of a matched filter. The code words are applied to delay line 236 and to the input of the first NOT circuit 237. As illustrated the delay line taps are separated by $\frac{1}{70}$ microseconds and in turn are coupled to NOT circuits 238 to **238*j*. The switches S1 to S12 are opened or closed appropriately depending upon the make up of the code word. Where a code word contains a 0 the NOT circuit should be rendered operative by opening its associated bypass switch. Where a 1 appears in the code word the NOT circuit should be bypassed by closing the bypass switch. When the unique code word, whether it is a master station or pseudo random code word, appears simultaneously on the inputs to AND gate 239**, an appropriate pulse is produced showing the detection of the considered code word.

While we have described above the principles of our invention in connection with specific apparatus, it is to be clearly understood that this description is made only by way of example and not as a limitation of the scope of our invention as set forth in the objects thereof and in the accompanying claims.

We claim:

1. In a communication system having a plurality of stations gaining communication access to a common repeater on a time division basis, a synchronizing system comprising in each of said stations;

first means responsive to a master signal transmitted from one of said stations through said repeater to produce a master sync pulse identifying the frame period of the time division multiplex format at said repeater;

second means coupled to said first means to select a time slot of said format with respect to said sync pulse that a particular one of said stations will communicate in through said repeater;

third means to control the time of transmission from said particular station through said repeater in said selected time, said transmission including a station identifying signal;

fourth means coupled to said second means and said third means responsive to said station signal to maintain the time of said transmission so that said transmission is confined to said selected time slot;

fifth means coupled to said fourth means to detect a timing error therein and produce a control signal; and sixth means coupled to said fifth means responsive to said control signal to transmit a pseudo random code word in place of said station signal;

said fourth means responding to said code word received from said repeater to adjust the timing thereof to overcome said timing error and thereby cause said transmission to again be confined to said selected time slot.

2. A system according to claim 1, wherein said transmission is an information burst in each one of said frame periods, said bursts each including in time sequence at least one of said station signal and said code word and at least a plurality of channels each representing in code form a sample of a different voice signal.

3. A system according to claim 1, wherein said sixth means includes means to reduce the power level of a carrier signal carrying said transmission below its normal operating level and amplitude modulate said reduced power carrier signal with said code word in response to said control signal.

4. A system according to claim 1, wherein said transmission when the system is synchronized is an information burst in each one of said frame periods, said bursts each including in time sequence said station signal and at least a plurality of channels each representing in code form a sample of a different voice signal, said burst biphase modulating a carrier signal of given power level for transmission from said particular station.

5. A system according to claim 4, wherein said sixth means includes means to reduce the power level of said carrier signal below said given power level and amplitude modulate said reduced power carrier signal with said code word in response to said control signal.

6. A system according to claim 1, wherein:
- said psuedo random code word is distinct for each of said stations,
- said station signal for each of said stations includes a different station code word distinct from all of said pseudo random code words,
- said master signal includes a master code word distinct from all of said station code words and all of said pseudo random code words, and further including a different matched filter to detect said master code word, and said station code word and said pseudo random code word of said particular station.

7. A system according to claim 1, wherein:
- said second means includes:
  - a binary counting means, and
  - means coupled to said counting means to preset the start of the counting cycle thereof to produce a pulse output at the end of said counting cycle time coincident with said selected time slot.

8. A system according to claim 1, wherein:
- said third means includes:
  - a first binary counting means to control said time of transmission, and
- said fourth means includes:
  - a second binary counting means responsive to said station signal during the absence of said control signal and said code word during the presence of said control signal to produce an output pulse after a predetermined count, and
  - logic circuit means coupled to said second means and said second binary counting means to maintain the counting of said first binary counting means during the absence of said control signal and to adjust the counting of said first binary counting means during the presence of said control signal to overcome said timing error.

9. A system according to claim 8, wherein said third means further includes a means coupled to said first binary counting means to preset the start of the counting cycle thereof to speed up the achievement of synchronization.

10. A system according to claim 1, wherein:
- said second means includes:
  - a first binary counting means, and
  - means coupled to said first binary counting means to preset the start of the counting cycle thereof to produce a pulse output at the end of said counting cycle time coincident with said selected time slot,
- said third means includes:
  - a second binary counting means to control said time of transmission, and
- said fourth means includes:
  - a third binary counting means responsive to said station signal during the absence of said control signal and said code word during the presence of said control signal to produce an output pulse after a predetermined count, and
  - logic circuit means coupled to said first binary counting means and said third binary counting means to maintain the counting of said second binary counting means during the absence of said control signal and to adjust the counting of said second binary counting means during the presence of said control signal to overcome said timing error.

References Cited

UNITED STATES PATENTS 3,320,611 5/1967 Sekimoto et al. ______ 343—6.5
3,418,579 12/1968 Hultberg ___________ 325—4 X RICHARD MURRAY, Primary Examiner
B. V. SAFOUREK, Assistant Examiner U.S. Cl. X.R.

178—69.5; 179—15; 325—39, 58; 343—7.5, 179